Feb. 25, 1958 H. WEIGOLD ET AL 2,824,336
APPARATUS FOR TREATING PNEUMATIC TIRES
Filed March 19, 1953 3 Sheets-Sheet 1

*INVENTOR.*
HAROLD WEIGOLD
ROBERT A. MERRILL
BY JOSEPH C. ANDREINI

Henry P. Truesdell
ATTORNEY.

Feb. 25, 1958     H. WEIGOLD ET AL     2,824,336
APPARATUS FOR TREATING PNEUMATIC TIRES
Filed March 19, 1953     3 Sheets-Sheet 2
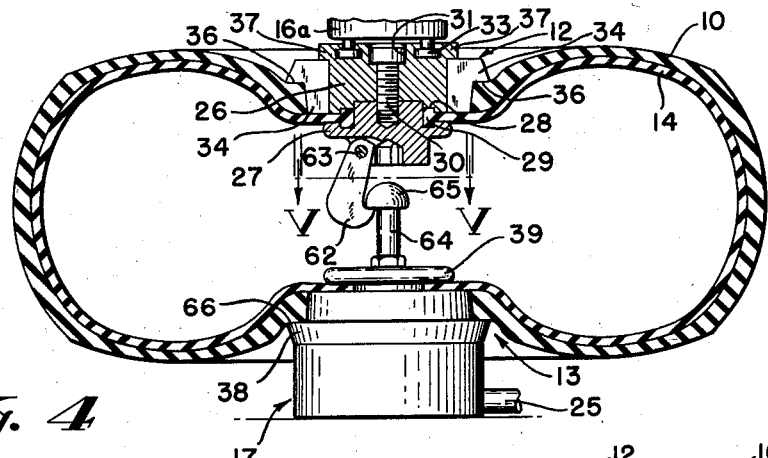
Fig. 4
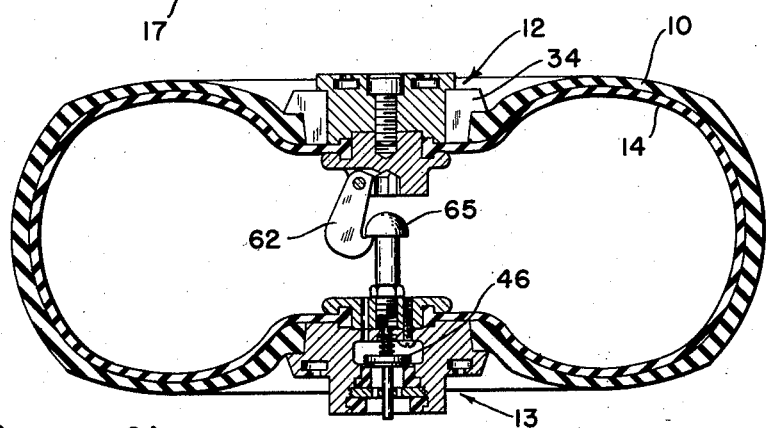
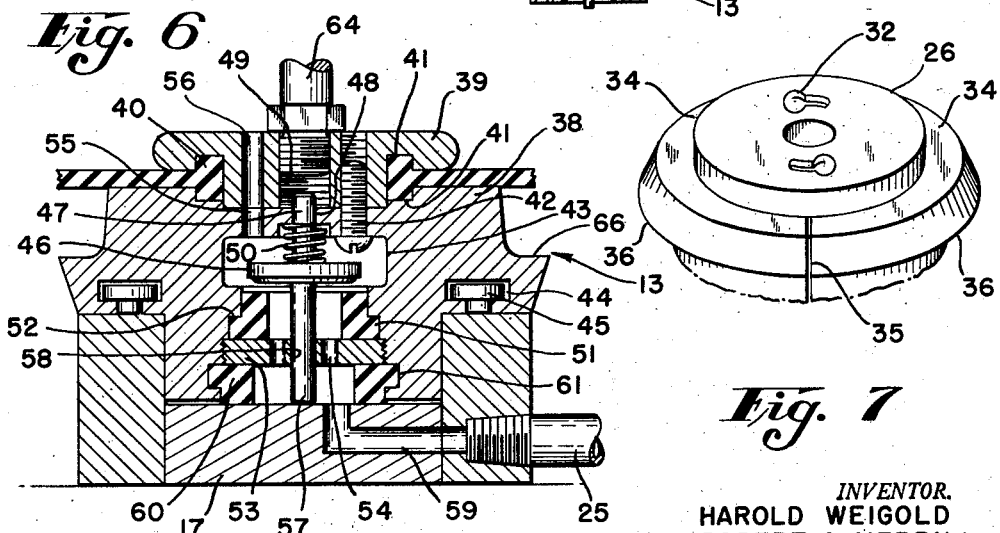
Fig. 6
Fig. 7
Fig. 8
INVENTOR.
HAROLD WEIGOLD
BY ROBERT A. MERRILL
JOSEPH C. ANDREINI
Henry P. Truesdell
ATTORNEY.

INVENTOR.
HAROLD WEIGOLD
ROBERT A. MERRILL
JOSEPH C. ANDREINI
BY Henry P. Truesdell
ATTORNEY.

United States Patent Office

2,824,336
Patented Feb. 25, 1958

2,824,336

APPARATUS FOR TREATING PNEUMATIC TIRES

Harold Weigold, Grosse Pointe Woods, and Robert A. Merrill and Joseph C. Andreini, Detroit, Mich., assignors to United States Rubber Company, New York, N. Y., a corporation of New Jersey Application March 19, 1953, Serial No. 343,426

1 Claim. (Cl. 18—2)

This invention relates to apparatus for treating pneumatic tires and more particularly to apparatus for shaping pneumatic tires from flat band form to a doughnut-shaped or toroidal form. The apparatus is especially useful in shaping pneumatic tires of large cross-sections through the tire carcass and of small inside or rim diameters.

In the shaping of such tires, for example tires used on aircraft tail wheels, it has been the custom to insert a conventional semi-rigid curing bag and then by a process of gradual inflation of the curing bag, alternated with setting periods for the carcass to retain its new shape, to give the carcass the necessary doughnut shape for loading in the vulcanizing mold. The process was time consuming. Moreover, after curing of the carcass, it was difficult to remove the curing bag without damage to it because the required curing bag of large cross-section had to be pulled through the narrow opening determined by the rim diameter of the finished tire casing. These deficiencies are overcome by the present invention which provides means for inserting a thin flexible curing bag within the tire carcass, shaping the carcass to toroidal form and then holding the carcass in such form for any period of time prior to or during vulcanization.

Therefore, it is an object of the present invention to provide a new and improved apparatus for shaping pneumatic tires particularly tires having large cross-sections with small rim diameters.

Another object of the invention is to provide means for shaping the tire and which further serves as a curing bag for the tire when the latter is vulcanized in conventional curing molds.

It is a further object of the invention to provide an improved means for inserting a curing bag within the tire carcass, for simultaneously shaping the carcass to toroidal form, and for holding the tire carcass and curing bag in such form until such time as it is desired to vulcanize the tire in conventional tire molds.

Still another object of the invention is to provide an improved curing bag arrangement and shaping mechanism which is assembled within the tire carcass and which may be used with conventional factory equipment such as a press for shaping the tire and conventional pot type heaters and unit vulcanizers for curing the carcass.

In the accompanying drawing,

Fig. 4 is a cross-sectional view through the tire carcass and shaping apparatus upon completion of the shaping process;

Fig. 6 is a cross-sectional view of the assembled apparatus and tire carcass the assembly being portable as a unit;

Fig. 7 is a perspective view showing one form of fastening mechanism for mounting the shaping apparatus on a press;

Fig. 8 is an enlarged view of the valve mechanism for supplying fluid to the interior of the curing bag.

Figure 2:
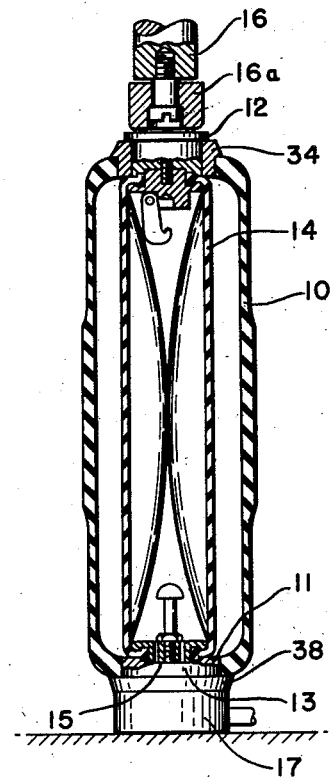
Fig. 2 is a cross-sectional view through the tire carcass and part of the shaping apparatus showing the parts in assembled relationship.

Turning to the drawing, Fig. 2 illustrates a pneumatic tire casing or carcass 10 in flat band form prior to being deformed into a doughnut shape or toroidal form necessary for vulcanization of the casing. The cross-sectional dimension of the casing, evidenced by the height of the flat band, is very large compared to the inside or rim diameter, as indicated at 11. A portion of the shaping apparatus of the instant invention is located within the interior of the tire carcass and comprises an upper head 12 and a lower head 13 for engaging the rim portions of the carcass. Disposed between the upper and lower heads is a flexible, expansible cylindrical member 14 of elastomeric material, such as natural or butyl rubber. The cylindrical member 14 functions as a shaping and curing bag when fluid pressure is applied to the interior of the bag through a valve mechanism 15 in the lower head, the details of which will be described later. The upper head 12 is connected to a hydraulic plunger or ram 16 through a swivel 16a and the lower head 13 fits into a stationary cup or receptacle 17.

Figure 1:
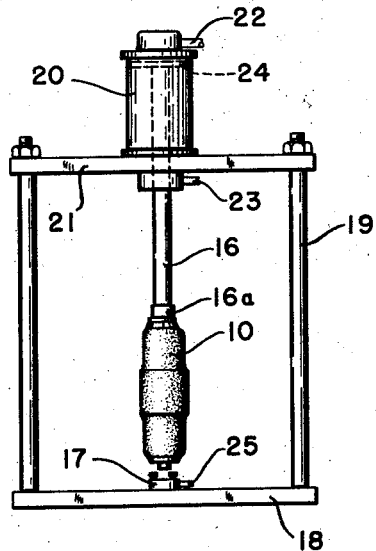
Fig. 1 is a view of the shaping apparatus with a tire carcass in band form mounted in position for shaping.

As shown in Fig. 1, the receptacle 17 is fastened to a stationary platen 18 of a conventional press structure 19 and the plunger 16 moves in a cylinder 20 carried by an upper platen 21 of the press. Fluid connections 22 and 23 serve to feed fluid into the cylinder 20 on opposite sides of a piston 24 secured to the ram 16. The arrangement is such that by feeding fluid under pressure or vacuum to opposite sides of the piston it is possible to lower and raise the ram 16 to deform the shaping apparatus and tire carcass.

Figure 3:
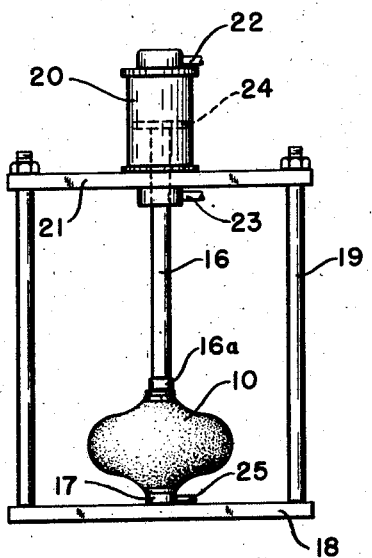
Fig. 3 shows the tire carcass in partially shaped condition.

Fig. 1 illustrates the tire carcass mounted on the shaping apparatus ready to be shaped upon downward movement of the ram 16 and Fig. 3 shows the tire carcass in partially shaped condition. During the shaping operation fluid under pressure is applied to the interior of the curing bag 14 from a supply pipe 25 connected to receptacle 17. After the tire carcass has been completely shaped to toroidal form, the tire carcass, with the shaping apparatus mounted therein, is removed from the press 19 and may be set aside until such time as it is to be placed in a conventional mold for vulcanization of the carcass. The manner in which the shaping apparatus cooperates with the relatively movable press elements and the mechanism by which such apparatus is held in the so-called shaped position will now be described.

In Fig. 4, it will be seen that the upper head 12 is formed in two parts comprising a ring 26 and clamping plate 27 each being provided with recesses 28 to receive a bead portion 29 formed on the end of the cylindrical flexible curing bag 14. These parts are held in assembled relationship by means of a tap screw 30 extending from the ring into the clamping member. The head of the screw is recessed into the ring 26, as indicated at 31. In order to secure the upper head 12 to the plunger 16 during the shaping operation, the ring 26 is provided with a plurality of keyhole slots 32, as best shown by Fig. 7. These cooperate with a corresponding number of pins 33 fastened to the end of the swivel 16a. Pins 33 are provided with enlarged ends which fit into the keyhole slots so that upon slight rotation of the swivel 16a the upper head 12 may be securely fastened to the plunger 16. After the tire casing has been slipped over the curing bag the two halves of a split collar 34 are assembled around the ring 26, the two halves being joined along the line 35, as indicated in Fig. 7. Each half of the collar is provided with an undercut flange portion 36 which is adapted to receive the bead portion of the tire casing, as indicated in Fig. 4. The two halves of the collar 34 receive the upward thrust of the tire casing during the shaping operation by bearing against a shoulder 37 formed on the upper part of the ring 26.

Similarly, the lower head 13 is formed in two parts comprising a ring 38 cooperating with a clamping member 39 adapted to receive the lower bead 40 of the cylindrical curing bag 14, the bead being held within recesses 41 formed in the ring and clamping member, respectively. The parts are held in assembled relationship by means of screws 42 extending from a recess 43 in the ring 38 into a threaded opening in the clamping member 39. Only one such screw is shown. In order to mount the lower head 13 on the receptacle 17, the ring 38 is provided with a plurality of keyhole slots 44, similar to those formed on the upper ring 26 as shown by Fig. 7. The receptacle 17 is provided with a plurality of pins 45 having enlarged ends which ride in the keyhole slots and serve to connect the lower head 13 to the receptacle 17 upon slight rotation of the head.

In order to admit fluid under pressure to the interior of the curing bag 14 during the shaping operation, and also during vulcanization of the tire carcass in a curing mold, the lower head 13 is provided with a valve mechanism shown most clearly by Fig. 8. A valve disc 46 is mounted for floating movement within the chamber 43 of the lower ring 38. It is provided with a guide pin 47 which extends from the upper surface of the valve disc through a guide slot 48 in the ring and into an opening 49 extending through the clamping member 39. A compression spring 50 surrounds the guide pin and depresses the valve disc to seat it against a valve seat 51. The valve seat rests against shoulders 52 located in the side wall of the recess 43 and is held in position by a locking washer 53 threaded into the wall of the recess. Valve seat 51 may be made of any suitable plastic or rubbery material and cooperates with the valve disc 46 to seal fluid under pressure within the interior of the curing bag 14.

To permit the passage of fluid under pressure to the interior of the curing bag, the locking washer 53 is provided with a plurality of openings 54 and, upon opening of the valve disc 46, the fluid pressure passes from the recess 43 through a plurality of aligned openings 55 and 56 in the ring 38 and clamping member 39, respectively, into the interior of the curing bag.

Although the valve mechanism is in normally closed position, it is opened upon seating of the lower head 13 on the receptacle 17 preparatory to a shaping operation. To this end, the valve disc 46 is provided with a lower extending finger 57 which is guided through an opening 58 in the locking washer 53 so that it engages the bottom wall of the receptacle 17. Upon doing so, it lifts the valve disc 46 free of the valve seat when the lower ring 38 is mounted on the receptacle 17 by means of the keyhole slot connection. A passageway 59 in the bottom of the receptacle feeds fluid under pressure from the supply pipe 25 to the interior of the recess 43 so that the fluid passes to the interior of the curing bag in the manner already described. Such fluid may be either compressed air, high pressure steam, or hot water depending upon the particular shaping or curing operation being performed. Escape of the fluid pressure is prevented by means of a rubber or plastic gasket 60 located in the bottom portion of the recess 43 and which is held in position by means of a shoulder 61 which fits into a suitable recess in the chamber 43. When the lower head is mounted on the receptacle 17 the gasket 60 is suitably compressed between the lower wall of the receptacle 17 and the locking washer 53 to form a fluid-tight seal.

Figure 5:
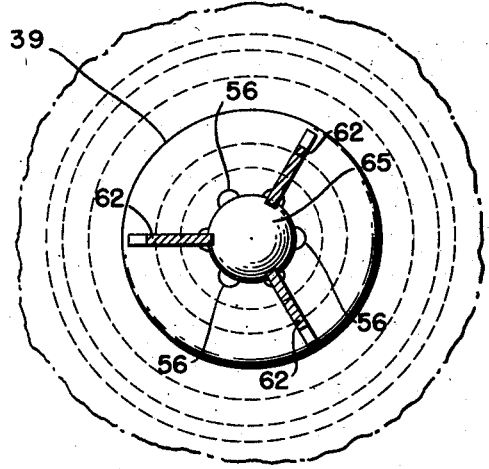
Fig. 5 is a cross-sectional view, taken along the line V—V of Fig. 4, showing part of the mechanism for retaining the apparatus in shaping position.

After the shaping operation it is desirable to remove the assembled shaping apparatus and tire carcass from the press mechanism as a unit. To do this it is necessary to provide means to lock the upper head 12 and lower head 13 together so that the tire carcass retains the toroidal shape which is necessary when placed in the mold for final cure. To this end, the upper clamping plate 27 is provided with a plurality of hooks 62 which are pivoted to the plate by means of pins 63. As shown in Fig. 5, three hooks are utilized disposed at angles of 120° to each other although the number of hooks may be increased or decreased at will. The hooks cooperate with a gripping element in the form of a pin 64 having an enlarged head 65 which engages the upstanding ends of the hooks. Pin 64 is threaded into the opening 49 in the lower clamping member 39. It will be seen that as the upper and lower heads are moved toward each other that the pivoted hooks 62 will be cammed outwardly by the enlarged head 65 and will thereafter drop into engagement with the underside of the pin head to lock the upper and lower heads together. When this has been accomplished the collar 16a and lower head 13 may be rotated to unlatch the keyhole slot connections with the press elements so that the assembled curing bag and tire casing may be removed from the press as a unit. Such assembly is shown by Fig. 6. Immediately upon removing the lower head from the receptacle 17 the spring 50 closes the valve disc 46 to prevent the escape of fluid pressure from the interior of the curing bag 14. This maintains the tire carcass in expanded shape.

In using the apparatus, the tire carcass in band form is first slipped up onto the plunger 16. The lower head 13 and upper head 12 are fastened to the receptacle 17 and plunger 16, respectively, by rotating the lower head and collar 16a to lock the keyhole slot connections. Thereafter, the tire carcass is dropped downwardly over the curing bag 14 so that the lower bead portion of the carcass rests against a flange 66 on the lower ring 38. The split collar 34 is assembled around the upper ring 26 so that it engages and firmly seats the upper bead portion of the carcass. The arrangement of the shaping mechanism and tire carcass is now that shown by Figs. 1 and 2. Since the valve disc 46 has been opened by seating of the lower head 13 on the receptacle 17, fluid under pressure may be admitted to the interior of the shaping bag 14 to expand the bag into the tire carcass. At the same time the plunger 16 is lowered to force the bead portions of the tire carcass toward each other. In this way the tire carcass is quickly shaped into a doughnut or toroidal form shown by Fig. 4. Continued movement of the two heads 12 and 13 together causes the latching mechanism comprising the hooks 62 and pin 65 to interengage so that upon a slight retraction of the plunger 16 the two heads are locked into position. It is now possible to remove the assembly from the press by rotating the collar 16a and retracting plunger 16 to its normal position, then rotating the assembly to disengage the lower head from receptacle 17. Upon removal of the assembly as a unit from the press the valve disc 46 closes to retain the fluid pressure within the curing bag 14.

The tire carcass, with the curing bag assembled therein, may now be set aside until such time as the assembly is placed in the mold for vulcanization. Inasmuch as the shaping mechanism comprising the curing bag 14 and the upper and lower head constructions constitutes a piece of portable equipment, a number of such shaping mechanisms may be used with a single press and vulcanizing mold. A considerable number of tire carcasses may be shaped and retained in the shaped position while waiting to be vulcanized. The small structure provided by the upper and lower heads 12 and 13 and the thin elongated cylindrical curing bag make it possible to insert the shaping apparatus into the interior of a tire carcass in band form which has extremely small rim diameter openings.

After vulcanization of the tire casing, the latching mechanism holding the two heads 12 and 13 together may be released by squeezing the heads together slightly, preferably while the assembly is in an inverted position as compared with Fig. 4. This permits the hooks 62 to fall away from engagement with the pin head 65. Additional internal pressure may be introduced at this time to keep the hooks 62 from re-engaging with pin 65 during subsequent handling of the assembly.

To remove the curing bag from the interior of the tire carcass the assembly is again mounted between the lower receptacle 17 and the plunger 16 by means of the keyhole slot connections. Upon gradual raising of the plunger 16 the heads are separated and the curing bag 14 withdrawn from the interior of the tire casing. If desired, a vacuum may be applied to the interior of the curing bag 14 by making a suitable connection to the fluid supply pipe 25 to aid in collapsing the bag.

Figure 9:
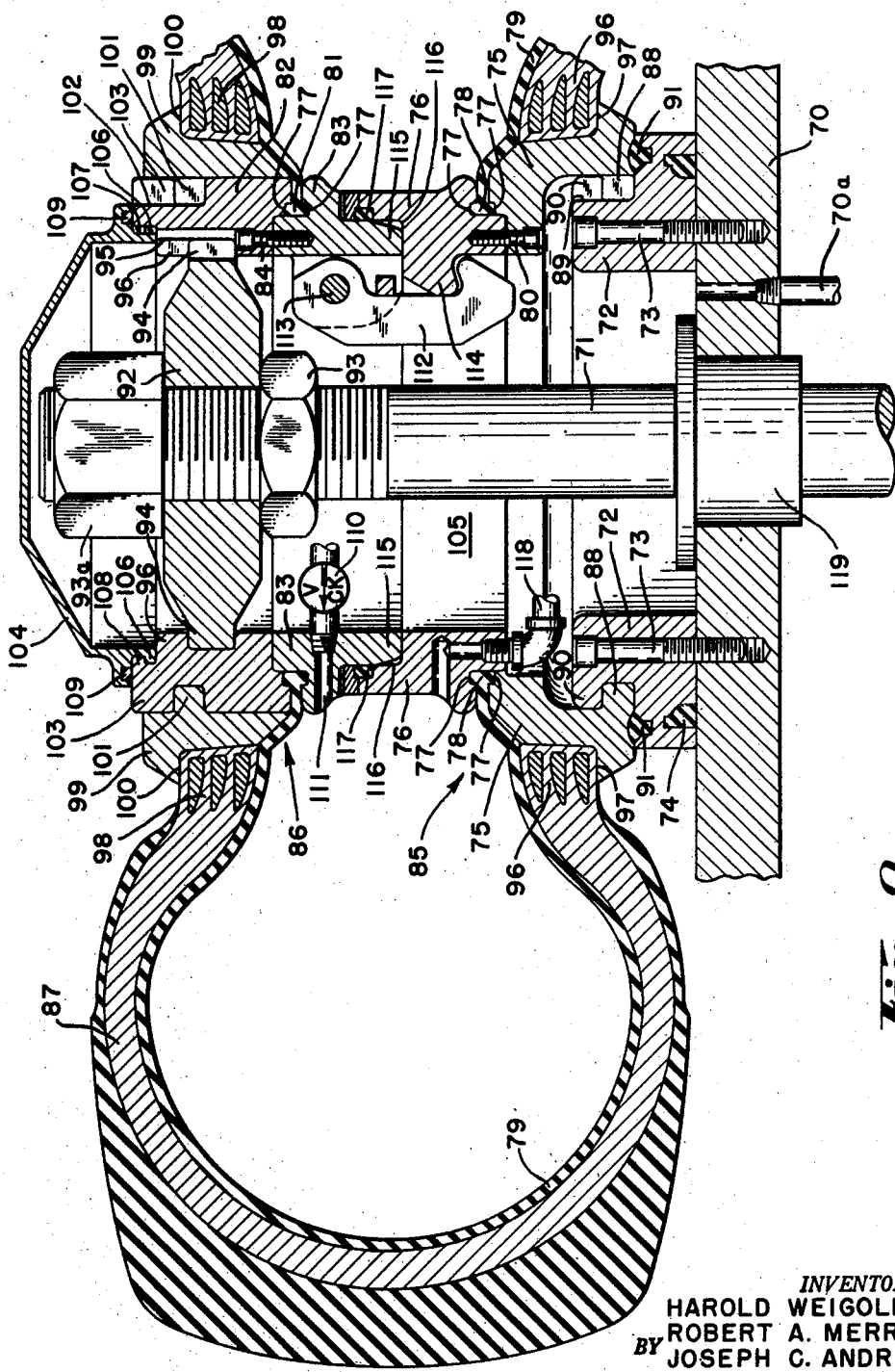
Fig. 9 is a sectional view through a modified form of apparatus particularly adapted for shaping large size tires.

In the event that it is desired to shape larger size tires the apparatus may be suitably altered to accommodate heavy carcass sizes, as in the arrangement illustrated by Fig. 9. The apparatus is mounted on a conventional heavy-duty press having a base plate or platen 70 and an upstanding ram or plunger 71 for cooperation with the movable parts of the shaping mechanism. A base ring 72 is fastened to the platen by means of a plurality of bolts 73. The interior of the ring will be subjected to pressure during the shaping procedure and is sealed to the platen by means of an annular gasket 74.

The shaping apparatus itself is seated on the base ring 70 and comprises a bead ring 75 for seating the tire bead and a cooperating clamping ring 76 for clamping a curing bag. Each of the parts is provided with an annular recess 77 which cooperates to engage the annular bead 78 formed at the lower end of the curing bag 79. The clamping ring 76 and the bead ring 75 are held in assembled relationship by a plurality of bolts 80 extending around the inner periphery of the two parts. The upper bead 81 of the curing bag 79 is held in corresponding recesses 77 formed, respectively, in an upper holding ring 82 and a mating bag clamping ring 83. Again, the holding ring 82 and bag clamping member 83 are held together by a plurality of bolts 84 extending around the inner periphery of the two parts.

The lower bead ring 75 and associated clamping ring 76 form, in effect, a lower movable head designated by the arrow 85, corresponding to the lower head 13 in the mechanism shown by Fig. 2. Similarly, the upper holding ring 82 and corresponding clamping ring 83 fastened to the upper end of the curing bag form, in effect, a movable upper head designated by the arrow 86, corresponding to the upper head 12 in the construction of Fig. 2. The upper and lower heads connected to opposite ends of the curing bag 79 may be moved relatively to each other during a shaping operation to permit mounting of a tire carcass 87 over the curing bag and subsequent shaping of the carcass.

In order to mount the lower head 85 on the base ring 72 the bead ring 75 is provided with a plurality of annularly arranged spaced projections 88 which are adapted to be seated in corresponding recesses 89 formed in the base ring 72. The bead ring 75 is placed on the base 72 so that the projections 88 fit into the recesses 89 and then the bead ring is rotated slightly to move the projections 88 beneath an extending flange 90 on the base ring. This locks the bead ring to the base forming, in effect, a bayonet joint, as indicated in the left hand portion of Fig. 9. A gasket 91 seals the joint between the bead ring 75 and the base ring 72.

In order to connect the upper movable head 86 to the press ram 71 a spider 92 is mounted on the ram against an adjustable stop nut 93 and is held in position by the lock nut 93A. The spider 92 is formed with a plurality of arms (only two of which are shown) and the ends 94 of the arms are seated in recesses 95 in the holding ring 82. When the spider is rotated slightly with respect to the holding ring the arms 94 are moved beneath a flange 96 of the holding ring 82 to form, in effect a bayonet connection between the spider and the holding ring 82, as indicated in the left hand portion of Fig. 9. After assembly of the spider and holding ring 82 a lock nut 93A is tightened to hold the spider in seated position. Since the movable upper head 86 is now locked to the ram 71 it may be moved up and down relative to the lower head by operation of the ram press.

In order to mount a tire carcass in band form on the shaping apparatus the ram 72 is extended so that the upper and lower heads are spaced apart to collapse the curing bag 79, the position of the apparatus being similar to that shown by Figs. 1 and 2. The tire carcass is now slipped over the upper head 86 and the curing bag 79 so that the lower bead portion 96 of the tire is seated against a bead flange 97 on the lower bead ring 75. The upper bead portion 98 of the tire carcass is held in position by a bead ring 99 carried by the holding ring 82. The bead rests against a flange 100 formed in the outer surface of a bead ring 99. The bead ring 99 itself is provided with a plurality of annularly arranged projections 101 which are seated in recesses 102 in the ring holder 82 when the bead ring is mounted in position. Thereafter the bead ring 99 is rotated slightly with respect to the ring holder 82 to lock the projections 101 beneath the extending flange 103 of the holder 82 to form, in effect, a bayonet joint between the parts, as indicated in the left hand portion of Fig. 9.

After mounting of the tire carcass in position, a cover 104 is mounted on the holding ring 82 to seal off an interior chamber 105 surrounding the ram 71 and which is formed by the stacked arrangement of the parts. It is secured to the holding ring 82 by a bayonet connection which includes projections 106 on the cover resting in recesses 107 in the ring holder 82; upon slight rotation of the cover the projections 106 are moved beneath a flange 108 on ring 82 to lock the cover in position. A gasket 109 seals the joint between cover 104 and holding ring 82 against leakage of fluid pressure from within the interior of the chamber 105 formed by the assembly.

At the start of the shaping operation the ram 71 is retracted to move the upper head 86 downwardly toward the lower head 85, movement of the ram being effective through the spider 92. At the same time, fluid at low pressure, for example, 10 pounds per square inch, is applied to the chamber 105 through an inlet pipe 70a in the platen 70. Such fluid pressure is fed to the interior of the curing bag 79 through a check valve 110 and conduit 111 carried by the clamping ring 83. The arrangement is such that the check valve 110 retains the fluid pressure within the curing bag when the shaping apparatus is removed from the ram and press.

In order to prevent separation of the heads under such fluid pressure when the shaping apparatus is removed from the press, and in order to maintain the tire carcass in shaped position, means is provided to lock the upper and lower heads together. To this end, a plurality of hooks 112 (only one of which is shown) pivoted to the clamping ring 83 at 113 are cammed over a projecting lug 114 formed on the lower clamping ring 76 so that they engage the underside of the projecting lug to lock the upper and lower heads together. At the same time, a depending skirt 115 on the upper clamping ring 83 nests within a recess 116 formed in the upper part of the lower clamping ring 76 to limit downward movement of the upper head. A gasket 117 is carried in the upper part of the lower clamping ring 76 and seals the joint between the skirt 115 and the clamping member 76 to prevent the escape of fluid pressure from the interior of the curing bag. A connector pipe 118 carried by the lower clamping ring 76 is sealed during the shaping operation with a heavy wax plug; this plug is automatically removed by the steam connection which is made at the beginning of the vulcanization operation after the assembled shaping apparatus and tire carcass has been placed within the tire mold. Any tendency of the fluid pressure within the chamber 105 to leak past the ram 71 is prevented by a conventional packing gland 119 incorporated into the platen 70 of the press.

After shaping of the tire carcass by inflation of the curing bag, and simultaneous movement of the upper and lower heads together, the shaping apparatus can be maintained in such position until the tire carcass with the shaping apparatus mounted thereon is placed within a vulcanizing mold. As already mentioned, during the initial shaping process accomplished by movement of the heads together, relatively low pressure is applied to the interior of the curing bag. However, because of the restraining action of the heavy tire carcass, it is desirable to apply relative high pressure, for example, 50 pounds per square inch, to the interior of the curing bag to complete the shaping of the carcass before the assembly is placed in the vulcanizing mold.

The construction of the shaping apparatus is such as to make it possible to remove the assembled apparatus and tire carcass as a unit from the press. To this end, the operator removes the cover 104 by unlocking the bayonet joint connection with the upper holding ring 82. The spider 92 is then disengaged from the upper head after removal of the locking nut 93A. By rotation of the lower bead ring 75 with respect to the base ring 72 the bayonet connection between these parts is broken to permit removal of the lower head 85 from the base. Thereafter the entire assembly of the upper and lower heads, curing bag and tire carcass may be removed as a unit and placed aside for subsequent mounting in a curing mold. The parts are held in the shaping position by engagement of the hooks 112 with the projecting lugs 114 on the upper and lower heads, respectively.

After the vulcanizing operation the shaping apparatus may be removed from the tire carcass by mounting it again on the press in the manner already described and connecting the spider 92 to the upper head 86. The hooks 112 are released manually and upward movement of the upper head 86 draws the curing bag 79 from within the interior of the tire. Upon stripping the curing bag vacuum may be applied to the interior of the bag through the connector pipe 118 while check valve 110 is manually closed. It will be seen that the modified construction of Fig. 9 functions in much the same way as the apparatus of Figs. 1 and 2 but that it is particularly designed for the shaping and subsequent vulcanization of heavy duty tires of large cross-section.

Having thus described our invention, what we claim and desire to protect by Letters Patent is:

A pneumatic tire shaping unit adapted to be positioned between the platens of a press, said unit comprising a pair of opposed heads, key slots in the extreme outer surfaces of each head for detachably connecting the heads to the platens of the press, an expansible cylindrical member of elastomeric material secured at each end to said heads and forming with said heads an air tight chamber, one of said heads being provided with a shoulder for receiving one of the bead portions of a pneumatic tire carcass, the other of said heads having a split collar detachably connected thereto and forming a shoulder for receiving the other bead portion of the pneumatic tire carcass, one of said heads having an opening therethrough for admitting gas into said chamber for expanding said cylindrical member when said heads are moved together, a valve in said opening, an operating rod connected to said valve and extending outwardly beyond said outer face whereby when said head is connected to the platen of the press said rod will be depressed and open said valve to admit gas into said chamber, and cooperating latch means on the inner faces of each of said heads within the confines of said expansible cylindrical member for locking said heads together after they have been moved together during the expansion of said expansible cylindrical member.

References Cited in the file of this patent

UNITED STATES PATENTS

| 1,389,442 | De Mattia | Aug. 30, 1921 |
| 1,713,658 | Hopkinson | May 21, 1929 |
| 1,947,258 | Gay | Feb. 13, 1934 |
| 1,982,860 | Desautels | Dec. 4, 1934 |
| 2,243,532 | Maynard | May 27, 1941 |
| 2,291,506 | Shook et al. | July 28, 1942 |

FOREIGN PATENTS

| 836,488 | France | Oct. 17, 1938 |